United States Patent [19]
Thompson

[11] Patent Number: 5,225,843
[45] Date of Patent: Jul. 6, 1993

[54] METHOD FOR ACCESSING A TRUNKED COMMUNICATION SYSTEM

[75] Inventor: Michael J. Thompson, Davie, Fla.

[73] Assignee: Motorola, Inc., Schaumburg, Ill.

[21] Appl. No.: 937,777

[22] Filed: Sep. 1, 1992

[51] Int. Cl.$^5$ .......................... H04B 7/00; G01S 5/02; F01F 11/06
[52] U.S. Cl. .................... 342/367; 342/357; 455/54.1
[58] Field of Search ............ 342/357, 367, 458; 455/33.1, 33.2, 33.3, 33.4, 54.1, 54.2

[56] References Cited

U.S. PATENT DOCUMENTS

| | | | |
|---|---|---|---|
| 4,229,620 | 10/1980 | Schaible | 342/458 |
| 5,043,736 | 8/1991 | Darnell et al. | 342/357 |
| 5,119,504 | 6/1992 | Durboraw, III | 455/54.1 |

*Primary Examiner*—Gregory C. Issing
*Attorney, Agent, or Firm*—Robert S. Babayi

[57] ABSTRACT

A communication system (100) is provided comprising a communication resource controller (110) which synchronously communicates with a communication unit (120). Communication range of the system is extended by adjusting transmission timing of a channel access request based on position information received from a global positioning system.

6 Claims, 2 Drawing Sheets

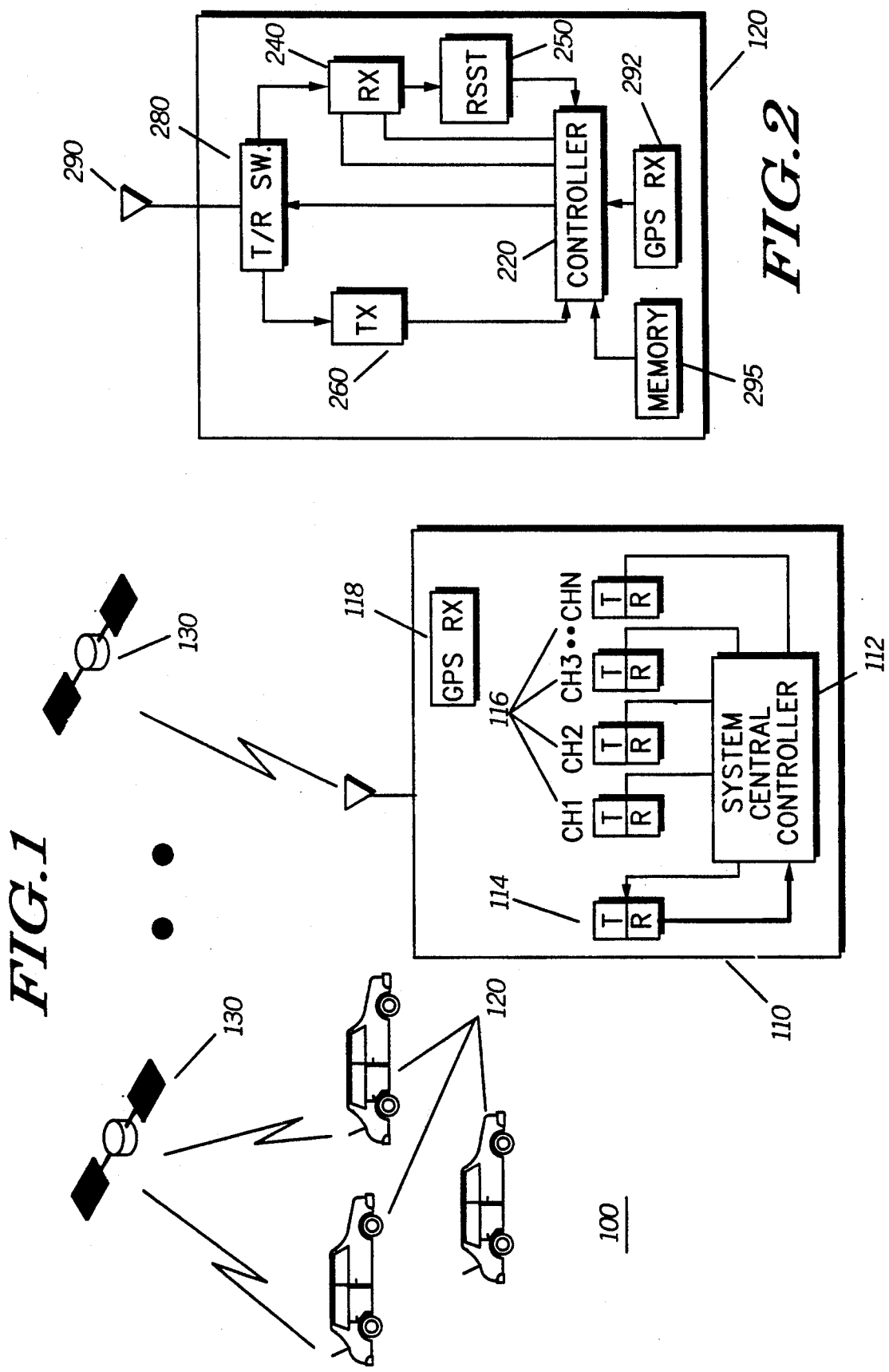

METHOD FOR ACCESSING A TRUNKED COMMUNICATION SYSTEM

TECHNICAL FIELD

This invention relates generally to the field of communication systems and in particular to a communication systems utilizing synchronous communication.

BACKGROUND

In today's point-to-point communications, trunked communication systems provide many advantages over conventional systems. The trunked communication systems provide efficient allocation of a limited number of communication channels to a large number of users. Additionally, many system features, such as channel privacy, user identification, etc., may easily be incorporated into the trunk communication systems.

In a trunked communication system, a communication resource controller and a plurality of communication units, such as portable and mobile two-way radios, communicate voice and data messages in a synchronous manner. The data messages, having a predetermined baud rate, are communicated on one or more control channels, and the voice messages are communicated on one or more voice channels. The communication resource controller, upon reception of an inbound channel request from one of the communication units, allocates a voice channel to that communication unit upon its availability. In conventional synchronous trunked communication systems, the communication resource controller receives only an inbound channel request during a predetermined access time interval. The access time interval equals duration of a predetermined number of data bits communicated between the communication unit and the communication resource controller. If an inbound channel request is received within the access time interval, a response is transmitted to the communication unit which then either indicates allocation of an available channel or indicates that all channels are busy.

The duration of the access time interval corresponds to the range within which a communication unit may properly communicate with the communication resource controller. For example, in a trunked communication system communicating data at a 3600 baud rate and having a 3 bit access time interval, the range of communication is approximately 75 miles. That is, a signal generated within a 75 mile range propagates during a 3 bit time interval before it reaches the communication resource controller. Therefore, the communication resource controller allows a 3 bit time interval for reception of an inbound channel request which translates into a communication range of 75 miles.

One of the problems associated with the 3 bit access time limitation is that a communication unit may be inhibited from accessing the communication system because the channel access request may reach the communication resource controller beyond the 3 bit time interval. This is especially true in mountainous communication sites where the radio frequency signals carrying the channel access request may be bounced off at many directions causing propagation delays of longer than 3 bit time interval. Also in ranges of longer than 75 miles, the communication unit may be inhibited from accessing the communication system even though its transmitter power output allows the communication unit to effectively communicate with the communication resource controller. Under these conditions the channel access transmissions from the communication unit may be ignored if the propagation delay exceeds the 3 bit time interval.

One prior art approach for solving the access problem discussed above causes the communication unit to transmit a channel access request and if a valid response is not received, the communication unit assumes that it is out of the communication range. Therefore, the communication unit advances transmission timing of the channel access in order to allow the channels access request to reach the communication resource controller within the 3 bit time interval. However, this method is iterative and time consuming. Furthermore, the decision to advance the transmission timing is based on an assumption which may not be true.

The access problem may also be overcome by utilizing asynchronous trunked communication systems. However, these systems have an inherently less efficient system throughput and do not offer many of the desirable features provided by synchronous communication systems.

It is, therefore, desired to extend the communication range of the trunked communication system, where the communication unit may access the communication resource controller when even when its distance prohibits access within the access time interval.

SUMMARY OF THE INVENTION

Accordingly, it is an object of the present invention to provide a synchronous communication system having an extended communication range.

Briefly, according to the present invention, a communication system comprises a communication resource controller and at least one communication unit. The communication unit communicates with the communication resource controller in a synchronous manner, and it is capable of accessing the communication resource controller during a predetermined access time interval. The communication unit determines whether the access request may be received during the access time interval by determining its distance from the communication resource controller. The communication unit determines the distance based on position information received from a global positioning system. If the distance of the communication unit from the communication resource controller exceeds a predetermined distance the transmission timing of the channel access request is adjusted to insure the channel access request is received by the communication resource controller within the access time interval.

BRIEF DESCRIPTION OF THE DRAWINGS

FIG. 1 illustrates a communication system which incorporates the features of the present invention.

FIG. 2 is a block diagram of a communication unit utilized in the communication system of FIG. 1.

DETAILED DESCRIPTION OF THE PREFERRED EMBODIMENT

Figure 3:
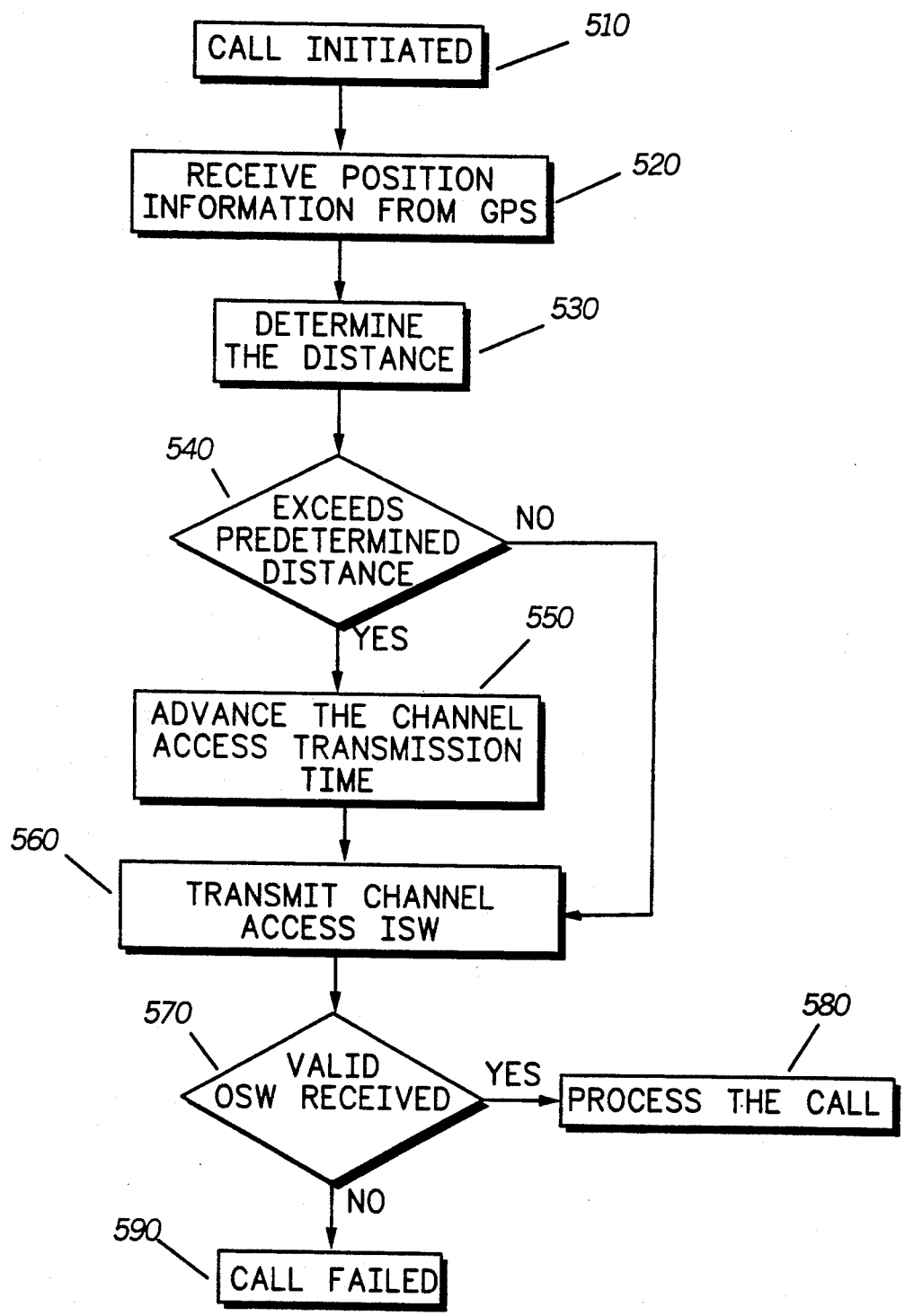
FIG. 3 is a block diagram of steps of yet another embodiment of the present invention

Referring to FIG. 1, a preferred communication system 100 having the range extending feature of the present invention is shown. The communication system 100 is a trunked communication system manufactured by Motorola Inc. which includes a communication resource controller 110 and a plurality of communication units 120 which are incorporated into a number of mobile vehicles.

Operation and constituting elements of trunked communication systems specially those offered by Motorola Inc. are well known. However, for simplicity of understanding the instant invention overall operation of one such system is briefly described. In the communication system 100, the communication resource controller 110 and the communication units 120 communicate control messages on a control channel and voice messages on a plurality of voice channels. The communication resource controller includes a control transceiver 114, and a plurality of voice and data transceivers 116 which operate under the control of a system central controller 112. The communication protocol on the control channel is predefined based on the requirement of the communication system 100. Under the protocol, the communication resource controller 110 transmits an outbound signaling words (OSW) on an outbound control channel and receives an inbound signaling word (ISW) on an inbound control channel. The communication units 120 receive OSWs on the outbound control channel and transmit ISWs on the inbound control channel. Each OSW is 84 bits long and is transmitted at 3600 baud during a 23 msec time interval. Each ISW is 78 bits long also having a 3600 baud rate. Bit pattern of The ISWs and the OSWs are defined by the communication protocol requirements so as to communicate the control information which enables orderly communication between the communication resource controller 110 and the communication units 120.

When the system is in idle state, i.e., no communication is in progress, the communication unit 120 monitors the outbound control channel for background data OSWs which are periodically transmitted by the communication resource controller 110. The communication resource controller 110 also monitors availability of other voice channels. The background OSWs contains such information as system identification and channel identification, which, among other things, inform the communication units 120 of their fleets and channel assignments to that fleet. The OSWs also provide synchronization among the communication units 120 within the communication system 100. Portions of the OSW bit stream are designated to provide both bit and word synchronization among the communication units 120 and the communication resource controller 110.

As defined by communication protocol, the resource controller 110 may only be accessed for channel allocation within duration of a predetermined number of bits. According to the communication protocol of the system 100, a 3 bit access time interval is provided for accessing the communication unit 120. When a call is initiated, the communication unit 120 enters its transmit mode to transmit a channel access ISW. The communication unit 120 transmit a first channel access ISW, on the inbound control channel, at a first access transmission time. The channel access ISW comprises information, such as fleet ID, unit ID, etc. Transmission of the first channel access ISW indicates that a communication unit 120 is attempting to access the communication resource controller 110 for allocation of an available voice channel. If the communication resource controller 110 receives the channel access request ISW within the duration of the access time interval, i.e., duration of 3 bits, it searches all the available voice channels and upon availability, allocates a voice channel to the communication unit 120. If an available channel is found, a channel grant OSW is transmitted to the communication unit 120, and if an available channel is not found a channel busy OSW is transmitted. The channel grant OSW indicates the channel number of the allocated voice channel to all of the communication units 120 operating within the communication system 100. Upon reception of a valid OSW (i.e., channel grant or busy), the initiated call is processed. When a call is being processed, all the communication units 120 which have the same fleet or subfleet number as the originating communication unit 120 revert to the allocated voice channel to carry on with the call.

Due to speed of electromagnetic waves (i.e., the speed of light), duration of each bit at 3600 baud rate corresponds substantially to 25 miles of propagation. Since the access time interval is equal to duration of 3 bits, only the communication units 120 operating within a 75 miles distance from the communication resource controller 110 may access the communication system 100. This is because a channel access request transmitted by the communication unit from a 75 miles distance reaches the communication resource controller 110 within a 3 bits duration. The purpose of the present invention is to provide communication capability for those communication units 120 which are distanced from the communication resource controller 110 at a range beyond 75 miles.

The present invention makes use of global positioning system (GPS) for positioning the communication unit 120 and determining its distance from the communication resource controller 110. The communication system 100 includes GPS satellites 130 which transmit position information to the communication units 120 and/or the communication resource controller 110. Global Positioning System and its operation are well known. GPS includes a number of satellites 130 which provide coverage for the entire Earth surface. These satellites provide position information by periodically transmitting radio frequency signals to GPS receivers positioned on the Earth surface. The GPS receivers are mainly used in roaming or traveling units for locating their instantaneous position relative to a known reference. Generally, the instantaneous position is expressed in terms of latitude, longitude and altitude coordinates. The GPS receivers, wherever located, receive and process the position information in a well known manner to derive at their coordinates. These coordinates are continuously updated as the traveling GPS receiver processes newly received position information from the GPS satellites 130.

In order to determine the distance between the communication unit 120 and the communication resource controller 110, the coordinates of both of these units are necessary. In most of the trunked communication system 100, the communication resource controller 110 is stationary having a fixed position. Therefore, the distance between the communication unit 120 and the communication resource controller 110 may be determined solely based on the coordinates of the communication unit 120. However, the present invention contemplates a communication system in which the position of the communication resource controller may be changed from time to time. Therefore, the communication resource controller 110 includes a GPS receiver 118 for providing its coordinates to the system central controller 112.

Referring to FIG. 2, the block diagram of an exemplary communication unit 120 which comprises a microprocessor controlled two-way radio is shown. The communication unit 120 can operate in receive or transmit modes for communicating control and voice messages with the communication resource controller 110. In transmit mode, the ISWs generated by a controller 220 are transmitted to the communication resource controller 110 via a well known transmitter 260. The controller 220 provides operational control and timing for the communication unit 120 by executing programmed instructions stored in its memory. In receive mode, the OSWs are routed to a radio receiver 240 via an antenna 290 and a Transmit/Receive (T/R) switch 280. The T/R switch 280 under the control of a controller 220 couples the antenna 290 to the radio receiver 240. The receiver 240 decodes the received OSWs, and applies them to the controller 220 for further processing. The controller 220 receives a received signal strength indicator (RSSI) signal proportional to the strength of the received signal from a RSSI circuit 250. Also coupled to the controller 220 is a GPS receiver 292 which provides position coordinates of the communication unit 120. The GPS receiver 292 may be a part of the communication unit 120 or be a separate unit coupled to the controller 220 via an external connector. The controller 220 processes the coordinates received from the GPS receiver 292 to determine the distance between the communication resource controller 110 and the communication unit 120. In order to determine the distance, in addition to the coordinates of the communication unit 120, the controller 220 also needs the coordinates of the communication resource controller 110. If the communication resource controller 110 is always stationary, the coordinates of the communication resource controller 110 may be pre-stored in a memory 295 in form of fixed coordinates. The coordinates prestored in the memory 295 may be provided to the controller 220 as needed to determine the distance. Alternatively, if the position of the communication resource controller 110 changes from time to time, the communication resource controller's position information as provided by the GPS receiver 118 (shown in FIG. 1) may be periodically transmitted to the communication unit 120. The controller 220 based on the coordinates of the communication unit 120 and the communication resource controller 110 can determine the distance therebetween using a well known programmed formula.

The purpose of the present invention is to provide a method of access for communication units 120 operating beyond the 75 miles range. The steps for accomplishing the present invention are shown in flow chart of FIG. 3. These steps are programmed into the controller 220 in a well known manner. The present invention extend the communication range of the trunked systems by adjusting the transmission time of the channel access request based on the distance the communication unit 120 from the communication resource controller 110.

Referring to FIG. 3, the range of the communication system 100 is extended by adjusting transmission timing of access request based on the distance of the communication unit 120 from the communication resource controller 110. The distance being derived according to position information provided by the global positioning system. In this embodiment, after the call is initiated, block 510, the communication unit 120 receives the position information, i.e. longitude, latitude, and altitude coordinates, from the GPS, block 520. In order to determine the distance from the communication resource controller 110, the communication unit 120 must have its coordinates as well as the coordinates of the communication resource controller 110. As explained before, the communication resource controller 110 may either receive its coordinates from the GPS satellites 130 and transmit them to the communication unit 120 or its coordinates may be prestored in the memory 295 of the communication unit 120. Based on these coordinates, the controller 220 determines the distance between the communication unit 120 and the communication resource controller 110 via well known calculation routines, block 540. Then, a determination is made as to whether the distance exceeds a predetermined distance, block 540. The predetermined distance is equal to the distance traveled by the channel access request ISW during access time interval. For a 3 bits access time interval the predetermined distance is 75 miles. If the communication unit 120 determines that the communication is beyond this distance, it advances the channel access transmission time by a number of bits which correspond to the distance from the communication resource controller 110, block 540. Accordingly, the communication unit 120 advances the transmission of the access request by 1 bit for every 25 miles distance above the 75 miles predetermined distance. For example, if the communication unit 120 is within 100 miles range from the communication resource controller 110, the transmission of the channel access request is advanced by one bit. Otherwise, if the communication unit 120 is within the 75 miles range, the access request is transmitted without advancing the transmission time, block 560. After transmitting the channel access request, the communication unit 120 determines whether a valid OSW is received, block 570. If a valid OSW is received, the initiated call is processed, block 580. Otherwise, the initiated call fails and the user is alerted, block 590.

Therefore, the invention solves an access problem in the trunked communication systems where out of range communication units may not reach the communication resource controller 110 within the access time interval. The range is extended by adjusting the transmission time of the channel access request based on the position of the communication unit 120 from the communication resource controller 110 by relying on information readily available from GPS satellites. As it may be apparent, the solution provided by the present invention are easily incorporated through minor hardware and software modifications to the existing systems.

What is claimed is:

1. In a communication system including a communication resource controller capable of synchronously communicating with at least one communication unit, said communication resource controller unit being accessible when an access request transmitted from said communication unit is received during an access time interval, a method for accessing said communication resource controller by said communication unit comprising the steps of:
   a) receiving position information from a global positioning system;
   b) determining distance between the communication unit and the communication resource controller based on the position information received from the global positioning system; and c) adjusting transmission timing of said access request according to the distance between the communication unit and the communication resource controller.

2. The method of claim 1, wherein said step c) includes the step of advancing transmission timing of said access request if the distance of the communication unit exceeds a predetermined distance.

3. The method of claim 1, wherein said step a) includes the step of receiving coordinates of the communication unit from the global positioning system, and wherein said step b) includes determining the distance based on the coordinates of the communication unit as received from the global positioning system and coordinates of the communication resource controller as stored within the communication unit.

4. The method of claim 1, wherein said step a) includes the step of receiving coordinates of the communication unit and the coordinates of the communication resource controller from the global positioning system, and wherein said step b) includes determining the distance based on the coordinates of the communication unit and the coordinates of the communication resource controller as received from the global positioning system.

5. In a communication system including a communication resource controller capable of synchronously communicating with at least one communication unit, said communication resource controller unit being accessible by said communication unit in response to reception of an access request during an access time interval, an apparatus for accessing said communication resource controller by said communication unit comprising:

receiver means for receiving a position information from a global positioning system;

determination means for determining distance between the communication unit and the communication resource controller based on the position information received from the global positioning system; and timing means for adjusting transmission timing of said access request based on the distance of the communication unit form the communication resource controller.

6. The apparatus of claim 5, wherein said receiver means includes means for receiving coordinates of the communication unit from the global positioning system, and wherein said determination means includes memory means for prestoring the coordinates of the communication resource controller, and wherein the distance is determined based on the coordinates of the communication unit as received from the global positioning system and prestored coordinates of the communication resource controller.

* * * * *